J. H. OLIVER.

Wooden Shoe-Pegs.

No. 6,090. Reissued Oct. 20, 1874.

*Witnesses,*

R. H. Poole

W. Le. Caldwell

*Inventor,*

Jas. H. Oliver

THE GRAPHIC CO. PHOTO-LITH. 39 & 41 PARK PLACE, N.Y.

UNITED STATES PATENT OFFICE.

JAMES H. OLIVER, OF BALTIMORE, MARYLAND.

IMPROVEMENT IN WOODEN SHOE-PEGS.

Specification forming part of Letters Patent No. 148,575, dated March 17, 1874; reissue No. 6,090, dated October 20, 1874; application filed August 19, 1874.

*To all whom it may concern:*

Be it known that I, JAMES H. OLIVER, of Baltimore, Maryland, have invented an Improvement in the Form or Figure of Wooden Shoe-Pegs, of which the following is a specification:

My invention consists in a wooden shoe-peg which, from its peculiar conformation, may be denominated the dovetailed wooden shoe-peg.

In order to perfect the construction of the peg, a superficial notch is cut, by machinery or otherwise, in one side of a wooden shoe-peg, as ordinarily used, and in such a manner as to form two inclined or dovetail-shaped surfaces extending from the bottom of the notch in the peg outwardly toward each end of it, the shape resembling dovetails on that side of the peg, diverging from the lowest point of the notch, which may be better illustrated by reference to the accompanying drawing.

Figure 1:
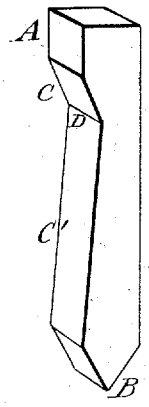
Figure 2:
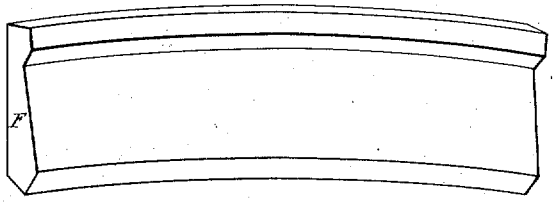
Figure 3:
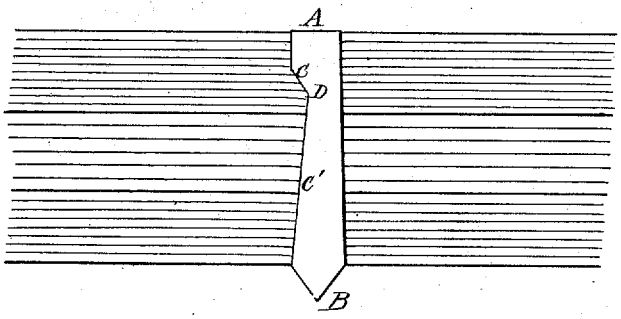

Figure 1 represents a perspective view of a single shoe-peg made according to my invention, with the notch on one side. Fig. 2 represents a peg-blank, from which is cut successively each shoe-peg of the notched form. Fig. 3 shows pieces of leather fastened together by means of these pegs.

A is the head or top of the peg; B, the point of the same. C C′ are the inclined surfaces of the peg which form the notch, of which D is the focus or lowest point. F is the end of the peg-blank from which the pegs are cut. Thus constructed, the peg represents double dovetails, diverging from the bottom or focus D of the notch toward either end of the peg.

It will be seen that the body of the dovetailed peg resembles two truncated half-wedges united at their smaller ends, the larger end of one of them forming the head or top of the peg, and the larger end of the other terminating in the point of the peg.

It is evident that when driven into the shoe the peg, from its dovetailed form, binds firmly against the leather, which, from the elasticity of its fibers, displaced by driving, renders the peg immovable. The upper inclined surface C of the notch, forming a portion of the head, forces the pieces of leather into perfect contact, while the lower inclined surface C′, having a reverse inclination, renders it almost impossible not only for the peg to be withdrawn, but for the outer piece of leather to become loose, which is nearly always the case with pegs of the ordinary construction.

Experience having shown that pegs formed of wood, from the elastic nature of the material, are better adapted for the purpose than any other substance, it is not contemplated to use metal of any kind for the construction of shoe-pegs of this form, to say nothing of the tendency of metallic fastenings to corrode and become loose.

Having thus described my invention, I claim—

A wooden shoe-peg, of the shape and form substantially as described, to be used as a fastening for boots, shoes, and other articles constructed wholly or in part of leather.

JAS. H. OLIVER.

Witnesses:

L. H. OLIVER,

C. H. POOLE.